United States Patent
Vincent et al.

(10) Patent No.: US 6,915,057 B2
(45) Date of Patent: Jul. 5, 2005

(54) CASSETTE FOR COILING AND HOLDING SPLICES BETWEEN CONDUCTORS, AND AN ORGANIZER FOR A PLURALITY OF SAID CASSETTES

(75) Inventors: Alain Vincent, Juilly (FR); Richard Biaud, Acheres (FR)

(73) Assignee: Nexans (FR)

( * ) Notice: Subject to any disclaimer, the term of this patent is extended or adjusted under 35 U.S.C. 154(b) by 18 days.

(21) Appl. No.: 10/371,999

(22) Filed: Feb. 21, 2003

(65) Prior Publication Data

US 2004/0042755 A1 Mar. 4, 2004

(Under 37 CFR 1.47)

(30) Foreign Application Priority Data

Feb. 28, 2002 (FR) .......................................... 02 02815

(51) Int. Cl.[7] ................................................ G02B 6/00
(52) U.S. Cl. ...................................... 385/135; 385/137
(58) Field of Search ................................. 385/134–137

(56) References Cited

U.S. PATENT DOCUMENTS 5,247,603 A * 9/1993 Vidacovich et al. ......... 385/135
6,112,006 A * 8/2000 Foss ............................ 385/135

FOREIGN PATENT DOCUMENTS

| CA | 2384252 | * 5/2001 | ............ G02B/6/44 |
|----|---------|----------|----------------------|
| WO | 9315426 | 8/1993 | |

OTHER PUBLICATIONS

Preliminary Search report dated Oct. 21, 2002.

* cited by examiner

*Primary Examiner*—John D. Lee
*Assistant Examiner*—Tina M Lin
(74) *Attorney, Agent, or Firm*—Sofer & Haroun, LLP

(57) ABSTRACT

The present invention relates to a modular cassette for coiling and holding splices between conductors, the cassette comprising: a base module substantially occupying a plane, the module having a conductor entry passage leading to first conductor coiling means and first holding means for holding splices between conductors; second conductor coiling means; and a first additional module receiving conductors, the additional module substantially occupying the same plane as the base module and being secured to the base module by releasable connection means. The base module of the invention contains said second coiling means and the first additional module of the invention contains holding means for holding connections being conductors.

9 Claims, 4 Drawing Sheets

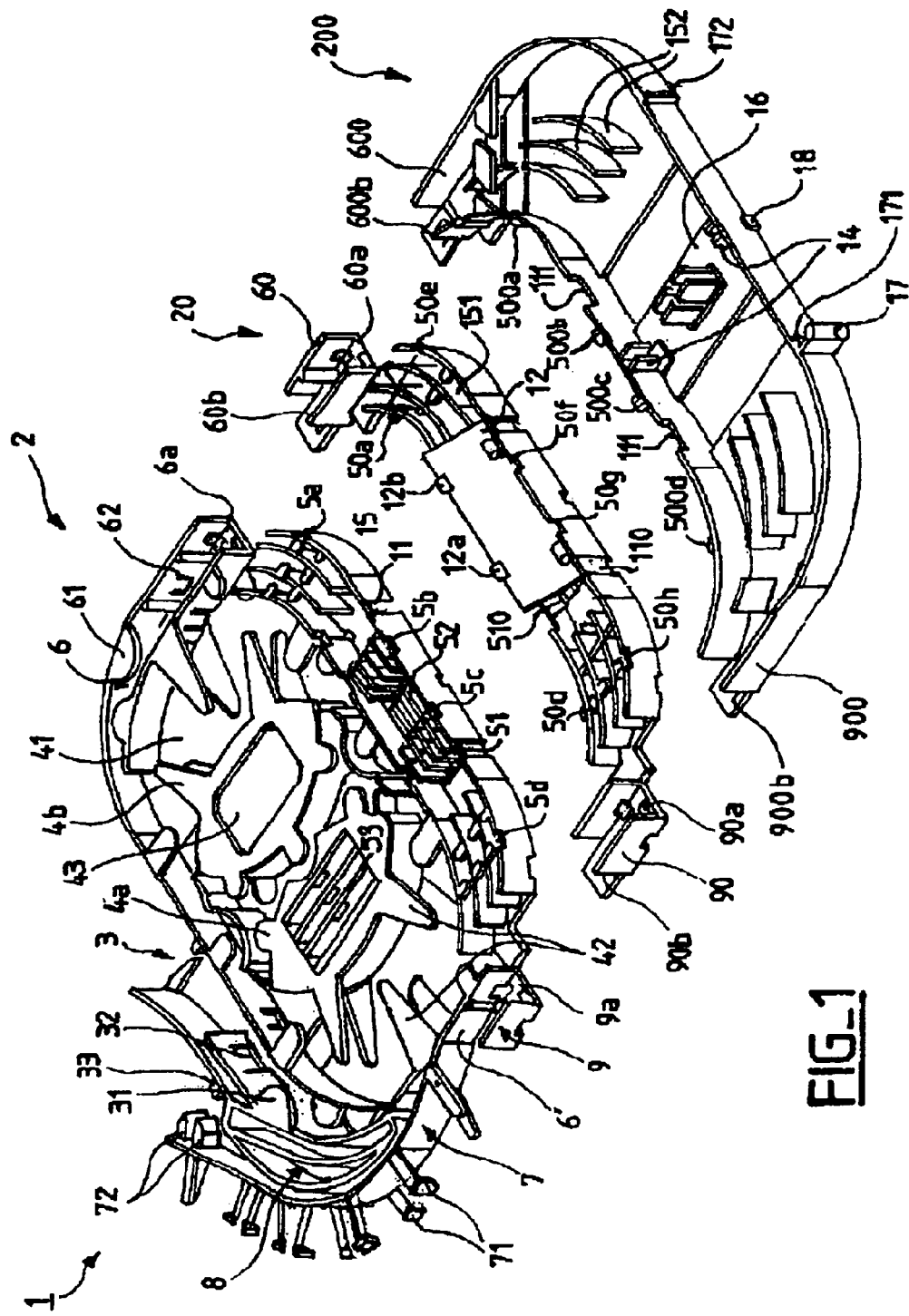
FIG_1

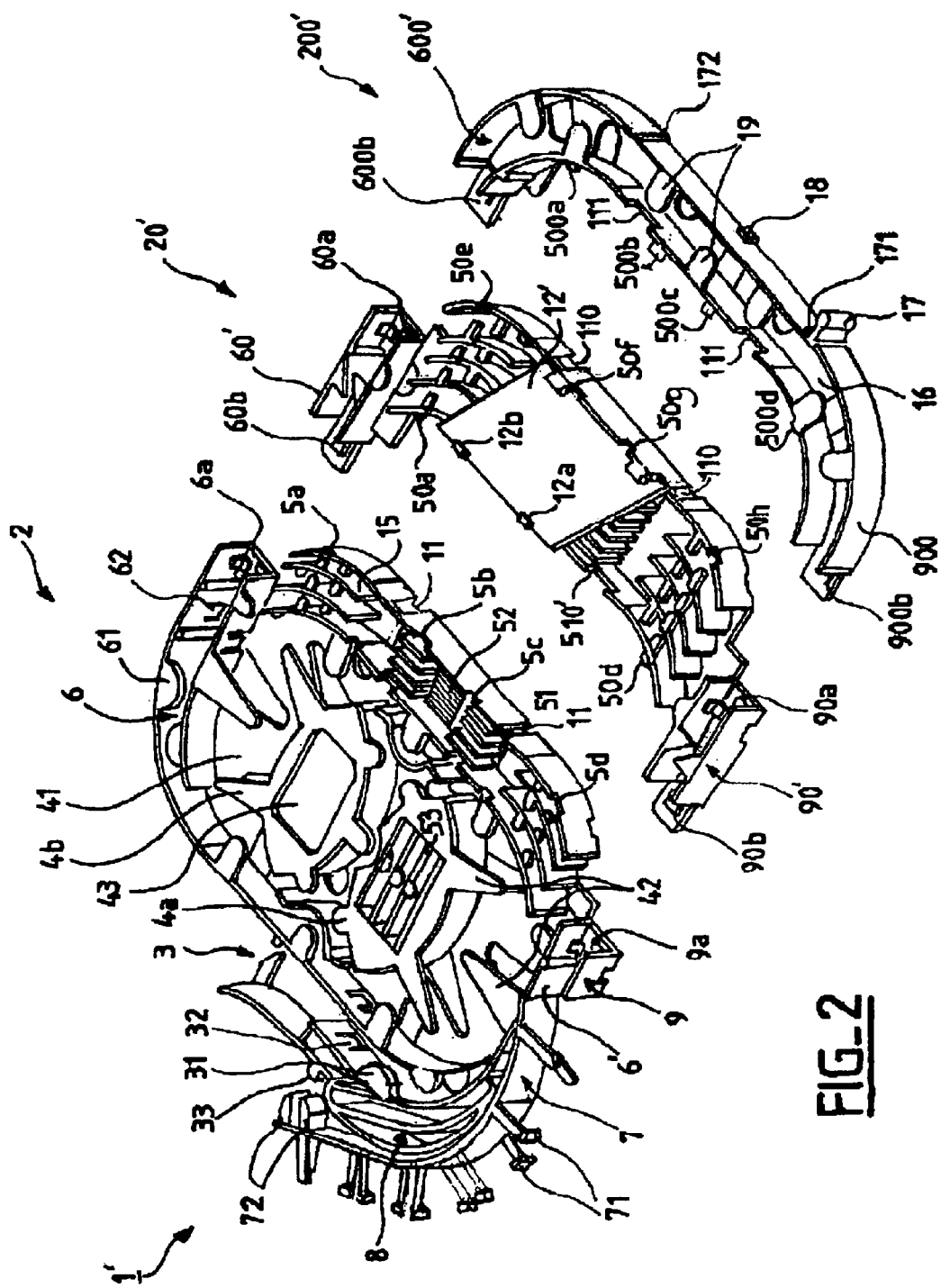
FIG._2

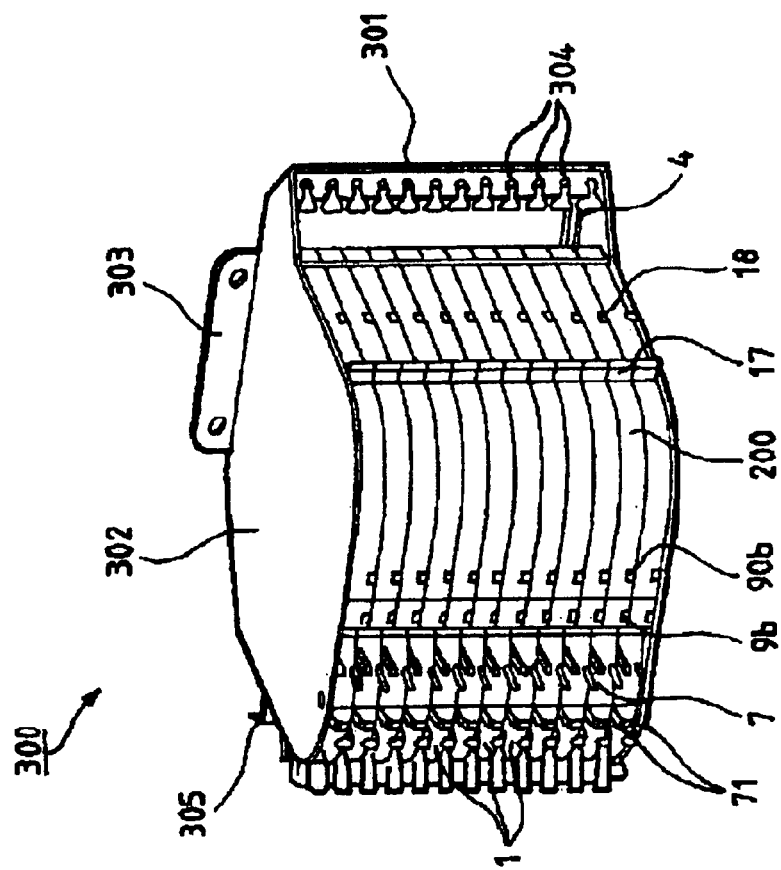
FIG_3
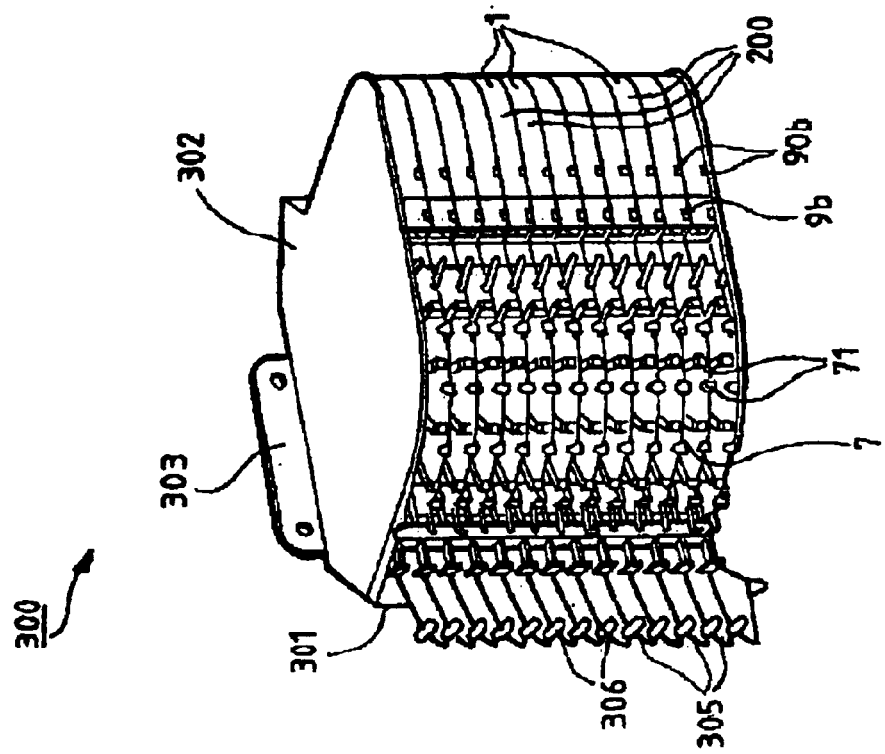
FIG_4

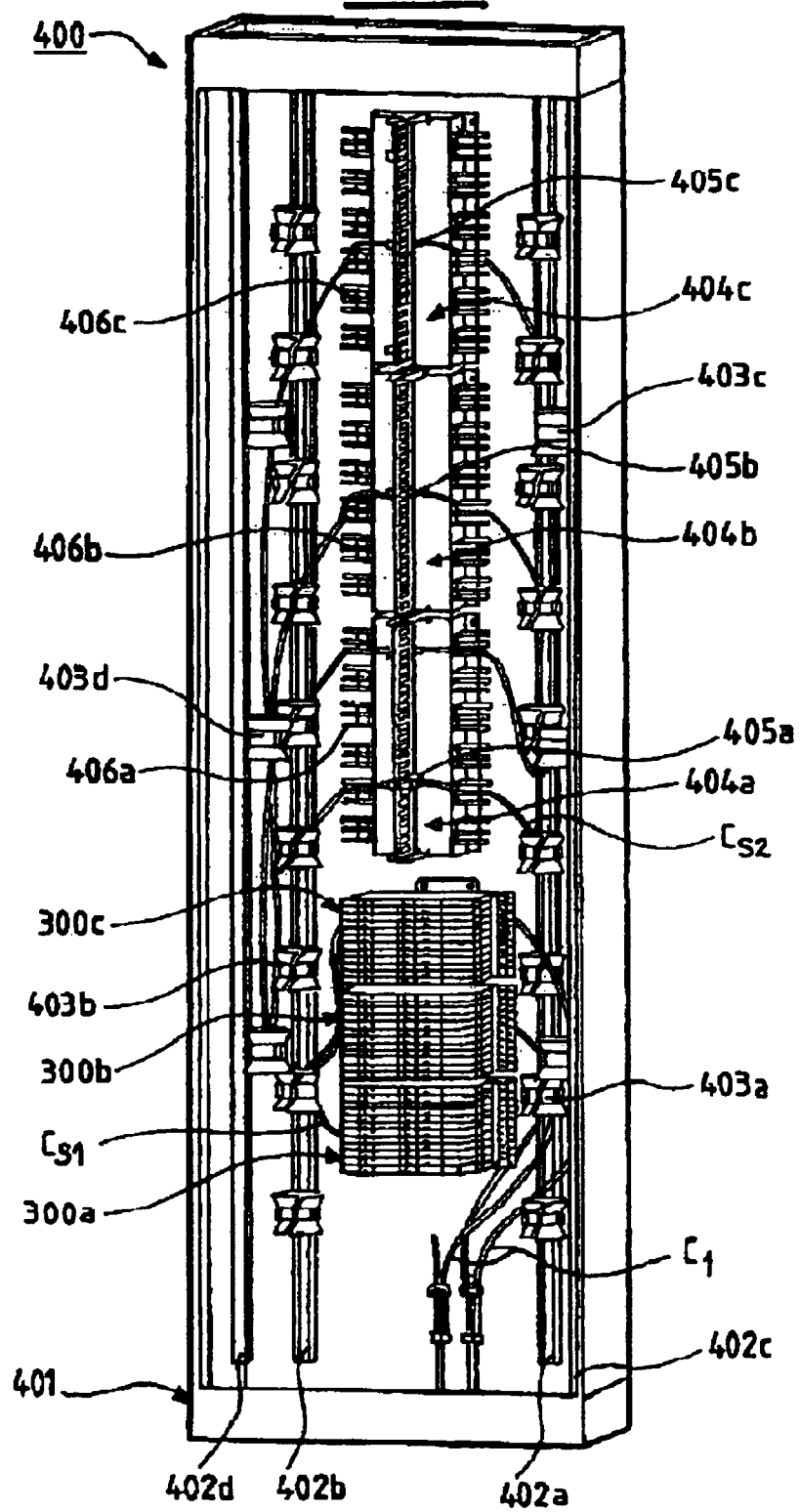

CASSETTE FOR COILING AND HOLDING SPLICES BETWEEN CONDUCTORS, AND AN ORGANIZER FOR A PLURALITY OF SAID CASSETTES

The present invention relates to cassettes, and more particularly to cassettes for receiving conductors. In the text below, the term "conductor" is used to cover both wire-shaped elements and ribbon-shaped elements, and in particular elements in which light can propagate, such as optical fibers.

BACKGROUND OF THE INVENTION

The organization of such conductors, for example optical fibers, in a container requires the use of a cassette system enabling said optical fibers to be stowed while complying with constraints on minimum radius of curvature and making it easy to take action on said fibers. As a general rule, existing cassettes are designed to hold a certain number of generally-protected permanent connections such as splices (a pair of fibers connected to each other), and also to enable extra lengths for splicing to be stowed, using coiling means.

U.S. Pat. No. 5,247,603 discloses a modular cassette for coiling and holding splices formed by respective pairs of optical fibers, the cassette comprising a base module substantially occupying a plane, having an entry passage for a first group of said pairs of fibers, first means for coiling the first group of fibers, and means for holding splices formed between the first group and a second group of said pairs of fibers.

In a first configuration, the cassette further comprises an additional coiling module disposed removably in the plane of the base module by removable rail-type connection means that are insertable in the base module, and that comprise second means for coiling the fibers of the second group of said pairs of fibers.

In another embodiment, that prior art step further comprises an additional "interconnection" module removably disposed in the plane of the base module by removable rail-type connection means insertable in the base module. That module is for guiding the second group of fibers and for connecting it at the exit from the module, e.g. to other optical fibers. Under such circumstances, the fibers of the second group, each having a splice at one end and a connector at its other end, are coupling intermediaries known as "pigtails" and they enable an indirect connection to be made between the fibers of the first group and other optical fibers.

In that prior art cassette, only one additional module can be adjoined to the base module, thereby limiting the field of use of that cassette.

OBJECTS AND SUMMARY OF THE INVENTION

An object of the present invention is to provide a modular cassette for coiling and holding splices between conductors, the cassette comprising a base module performing the function of coiling all of the fiber splice extra lengths, in order to enable at least one additional module secured to the base module by a releasable connection to perform at least one conductor connection function that is determined with respect to customer requirements.

To this end, the invention provides a modular cassette for coiling and holding splices between conductors, the cassette comprising:

a base module substantially occupying a plane, the module having a conductor entry passage leading to first conductor coiling means and first holding means for holding splices between conductors;

second conductor coiling means; and a first additional module receiving conductors, the additional module substantially occupying the same plane as the base module and being secured to the base module by releasable connection means;

wherein the base module contains said second coiling means and wherein the first additional module contains holding means for holding connections between conductors.

The connection to be held may be direct (of the splice, joint, connector, etc. type), and/or indirect (of the "pigtail", jumper, connection cord, or via components of the WDM multiplexer/demultiplexer type, etc. . . . ) and it may be permanent and/or temporary.

The modular cassette of the invention enables all of the usual functions that are desired to be brought together in an overall volume that is as compact as possible. For example, the base module performs the functions of coiling and holding splices while the first additional module performs the function of cross-connecting and/or integrating active or passive components.

Advantageously, the cassette of the invention may comprise a second additional module receiving conductors, the second module lying substantially in the same plane as the base module and being secured to the first additional module by releasable connection means.

Adding a second module extends the configurations that are possible for the cassette of the invention. The second module can thus perform the same function as the first module in order to increase the capacity of the connection elements to be included and held within the cassette, or it can perform a distinct function such as merely guiding conductors towards an exit from the cassette.

In a preferred embodiment, the second additional module of the invention includes means for holding connections between conductors.

The connection-holding means of the invention may be selected from splice-holding means and connector-holding means.

For example, splice-holding means of a first and/or a second additional module may enable the number of splices held to be increased and/or may diversify the types of splices that can be held, as a function of operator configurations.

In addition, each additional module may be hybrid, i.e. it may comprise two different types of connection-holding means simultaneously.

The base module of the invention may include a conductor exit passage which is distinct from said entry passage, placed so as to guide the conductors coming from the first and/or second coiling means and going to at least one additional module.

In an advantageous embodiment, the base module of the invention has second splice-holding means that are removable and inserted in a storage position in one of the coiling means.

In use, the second splice-holding means may replace at least one of the likewise-removable first splice-holding means, or may be superposed vertically relative to one of said first splice-holding means.

In addition, the removable connection means of the invention may be of the type having a snap-fastening tab.

The cassette of the invention may preferably include at least one protective cover covering one of the splice-holding means.

The invention also provides a conductor organizer comprising a plurality of cassettes as described above, which are superposable and pivotally mounted to a housing support.

Each of said cassettes superposed in the organizer may include a flexible cassette pivot arm, the arm being folded and pressed against the base module when the cassette is in the closed position in the organizer, and unfolding while the cassette is moved into its open position.

BRIEF DESCRIPTION OF THE DRAWINGS

The characteristics and objects of the present invention appear from the following detailed description given with reference to the accompanying figures which are purely illustrative and non-limiting.

In the figures:

FIGS. 1 and 2 are perspective views of a modular cassette of the invention in two preferred embodiments;

FIGS. 3 and 4 are perspective views of an organizer of the invention; and

FIG. 5 shows an example of a bay containing three organizers of the kind shown in FIG. 3.

MORE DETAILED DESCRIPTION

FIGS. 1 and 2 show respective modular cassettes 1 and 1' of the invention. Elements which perform the same functions and which are identical in both embodiments are given the same references.

As can be seen in the figures, the cassette 1, 1' comprises a base module 2, a first additional module 20, 20', and a second additional module 200, 200'. The additional modules 20, 20', 200, 200' are disposed substantially in the same plane as the base module 2, e.g. a horizontal plane, and they have releasable connection means, for connecting the first additional module 20, 20' to the base module, and for connecting the second additional module 200, 200' to the first additional module 20, 20' respectively. All of the modules of the cassette 1, 1' and the various dispositions provided thereon are made out of a molded plastics material.

The base module 2 mainly comprises:

- a conductor entry and/or exit passage 3 for passing conductors such as optical fibers, optionally grouped together, optionally stripped, the passage being provided at a front peripheral edge of the module 2 close to a corner;
- first and second coiling means 4a, 4b for coiling conductors received via the entry passage 3, in particular;
- first splice-holding means 51, 52 for holding splices between fibers, respectively for housing splice protections of medium and of small size, said means being situated in a rear portion of the base module 2;
- removable second splice-holding means 53 for housing splice protections of large size; and
- a conductor entry/exit passage 6 for passing conductors of the fiber and/or cable type, this passage being distinct from the entry/exit passage 3 for guiding the coiled conductors coming from the first and/or second coiling means 4a and 4b and going, for example, to the second additional module 200, 200'.

The first and second coiling means in both embodiments are constituted by respective drums 4a, 4b each having a semi-circular peripheral portion enabling fibers to be coiled in empty spaces such as 41 that are left hollow and that communicate with one another and with the entry and/or exit passage 3. The coiling means 4a, 4b enable all types of extra length to be handled and the way the drums are disposed makes it possible to reverse the coiling direction. In addition, a label-carrying location 43 is defined on the coiling drum 4b.

Facing the coiling spaces 41, there extend retaining means for retaining splices and/or coiled conductors, such as flat tabs 42 carried by the peripheral edges of the base module 2 and/or the means 4a, 4b.

The splice-holding means 51 to 53 are formed by sets of ribs between which the splices are wedged, and the ribs are advantageously adapted to splices of different types. The first means 51 to 52 can be broken off from the cassette.

The second removable splice-holding means 53 are inserted, in a storage position, inside the first coiling means 4a. In an in-use position, the second splice-holding means take the place of the first means 51 and/or 52, or they are superposed on the first splice-holding means 52.

On either side of the holding means 51, 52, there are disposed guide channels 15 for guiding the fibers to be spliced and for ensuring they comply with minimum radii of curvature, in particular.

The entry and/or exit passage 3 has flat tab type retaining means 31 for retaining conductors and provides a location in a zone 32 for a cable-securing type element.

Similarly, the entry and/or exit passage 6 for conductors of the fiber and/or cable type has flat tab type retaining means 61 for retaining conductors, and a location is provided in a zone 62 for a cable guide element.

Furthermore, the module 2 has a flexible arm 7 for pivoting the cassette 1, 1', the arm being pivotally mounted on a housing support (not shown) of an organizer (see FIGS. 3 and 4).

The arm 7 is folded and pressed against the module 2 when the cassette 1, 1' is in the closed position inside the organizer, and it unfolds while the cassette is being moved into the open position. The module 2 has a through guide slot 8 for providing guidance during cassette pivoting, said slot receiving a guide pin (not shown) secured to the organizer support and parallel to the fixing axis. This slot is oblong and arcuate in shape. It extends substantially along the arcuate corner of the module 2 against which the arm 7 is folded down.

The flexible arm 7 has two terminal tabs 72 for fixing to the housing support. These fixing tabs 72 perform two functions. Firstly, the outside portions of the tabs 72 snap-fasten into a rectangular opening of the housing support to hold the arm 7 therein. Secondly, while the cassette 1 is closing, a finger 33 situated on the outside edge of the entry and/or exit passage 3 becomes inserted between the tabs 72 for indexing (blocking) in the closed position.

The arm 7 also has fins 71 secured to its two longitudinal edges and projecting on the same side so as to retain conductors, in particular conductors going to or coming from the second additional module 200, 200'. The arm 7 defines a guide path of constant length for guiding the conductors, thereby ensuring that they are subjected to no or practically no stresses during pivoting of the cassette. The fins 71 preferably alternate from one edge to the other of the arm so as to make it easier to insert conductors in the path it defines. The fins 71 are provided only on that portion of the arm 7 which serves to convey conductors. At least some of the fins 71 have terminal portions angled to face the arm 7 so as to retain and protect the conductors and define their guide path. Naturally, the flexible arm 7 may be fixed to the module 2 instead of forming an integral portion thereof.

A portion 6' of the peripheral edge along the arm 7 is preferably breakable so as to create another opening for conductor entry and/or exit.

Concerning the releasable connection between the base module 2 and the first additional module 20, 20', the base module 2 has receiver means 6a, 9a for receiving snap-fastening tabs 60b, 90b of the first additional module 20, 20'. These means 6a, 9a are disposed respectively one at the end of the exit and/or entry passage 6 and the other on an exit corridor 9 situated on the side opposite to the passage 6. The base module 2 also has crenellations 5a to 5c disposed on its rear peripheral edge remote from the entry and/or exit passage 3, suitable for receiving tabs 50a, 50d (some of which are not shown) projecting from the first additional module 20, 20'.

The first additional module 20, 20' mainly comprises:

an "entry" guide corridor 60, 60' for guiding conductors, in particular those coming from the exit and/or entry passage 6 going towards the second additional module 200, 200', and having a projecting portion 60b defining the snap-fastening tab insertable into the receiver means 6a;

another guide corridor referred to as an "exit" corridor 90, 90' for conductors, in particular conductors coming from the second additional module 200, 200', and carrying the projecting portion 90b of the snap-fastening tab type suitable for insertion in the receiver means 9a, the exit corridor 90, 90' being disposed on the opposite side to the exit corridor 60, 60';

two types of splice-holding means 510, 510' for holding splices between fibers (only one being visible), e.g. means similar to the means 51, 52; and a protective cover 12, 12' covering the means 510, 510' and including two handling studs 12a, 12b.

The second splice-holding means 53 may replace at least some of the means 510, 510' which are also removable. On either side of the holding means 510, 510', there are disposed guide channels 151, 151', e.g. channels similar to the channels 15 of the base module 2.

Concerning the releasable connection between additional modules, the first module 20, 20' has receiver means 60b, 90b for receiving snap-fastening tabs 600b, 900b of the second additional module 200, 200' placed in the associated guide corridors 60, 90, 60', 90'. The first module also has crenellations 50e to 50h placed on the "rear" peripheral edge adjoining the second additional module for the purpose of receiving tabs 500a to 500d projecting therefrom.

The second additional module 200, 200' mainly comprises:

a "entry" passage 600, 600' for conductors, in particular conductors coming from the guide corridor 60, 60' and including the projecting portion 600b defining the snap-fastening tab insertable in the receiver means 60a; and an "exit" passage 900, 900' for conductors received by the second additional module 200, 200', and including the projecting portion 900b of the snap-fastening tab type that is insertable in the receiver means 90a, the passage 900, 900' being disposed on the opposite side to the passage 600, 600'.

The second additional module 200, 200' has a finger 17 projecting close to a corner of the rear peripheral edge close to the passage 900, 900'. This finger 17 is of smaller thickness than the cassette 1, 1', thereby enabling it to be selected and taken hold of when in a superposition of other cassettes. It enables said desired cassette 1, 1' amongst the superposed cassettes to be actuated so as to move the cassette in the open position.

In addition, the base module 2 and the additional modules 20, 20', 200 have openings 11, 110, 111 between the guide channels 15, 151, 151' and the holding means 51, 510, 510' formed on their peripheral edges in order to enable the protective cover 12, 12' to pivot. The module 200' also has such openings 111 in its front peripheral edge.

Two slideways 171, 172 enable an identifying label (not shown) to be put into position, and a tab 18 provides an abutment in translation.

The second module shown in FIG. 1 also has means 14 for holding two connectors (not shown). These means are adapted to the connectors that are to be received, such as multi-path entry and/or exit connectors.

On either side of the holding means 14, the bottom 16 of the module 200 is open, said module having guide channels 152, e.g. channels similar to the channels 15 of the base module 2.

The second module 200' shown in FIG. 2 further comprises retaining means 19 for retaining the conductors, said retaining means being of the flat tab type carried in alternation on the front and rear peripheral edges.

In a variant of the first embodiment (not shown), the cassette of the invention may have a base module with an opening as made possible by breaking the breakable portion 6' and replacing the outlet passage 6. In this variant, the cassette preferably comprises only a first additional module for splice holding. The two modules then do not include exit corridors, the releasable snap-fastening type connection means consequently being offset towards the center of the rear peripheral edge.

FIGS. 3 and 4 are perspective views of an organizer of the invention 300 comprising a plurality of cassettes 1 as described above, for example with reference to the first embodiment.

As already shown in FIGS. 1 and 2, the rear peripheral edges of the modules 200 carry the tabs 18 and the handling fingers 17. Thereafter, going towards the front of each cassette, the side peripheral edge has snap-fastening receiver means 9b, 90b, followed by the arm 7.

The cassettes 1 are superposable and they are mounted to pivot in a housing support 301. The organizer also has a protective cover 302 covering the cassettes 1, and an upright 303 having two holes for fixing the organizer in a bay (see FIG. 5).

A first staged spreader device 304 with an individual guide channel for each cassette is used for entry and retention, e.g. of the fibers of a main incoming cable and/or distribution cables $C_1$ going to the entry and exit passage (not shown) of each cassette.

Similarly, another staged spreader device 305 having an individual guide channel for each cassette and fins 306 allows exit and retention, e.g. of fibers of a main outgoing cable and/or of distribution cables (not shown) coming from the arm 7 having fins 71 on each cassette 1.

FIG. 5 shows an example of a bay 400 incorporating three organizers 300a to 300c of the kind described with reference to FIG. 3.

The bay comprises a cabinet 401 with four vertical uprights 402a to 402d each having a plurality of guide elements 403a to 403d for conveying conductors $C_1$, $C_{s1}$, $C_{s2}$ going either towards the organizers or towards cross-connect panels 404a to 404c having interconnection means 405a to 405c and guide channels 406a to 406c. The disposition of the organizers in the bay 400 may be changed.

Naturally, the above description is given purely by way of illustration. Without going beyond the ambit of the invention, any means may be replaced by equivalent means.

The exit passages of the invention may be entry passages, and vice versa.

The number, selection, and order of additional modules depends on user requirements.

The connection-holding means of the additional modules of the invention may be means for holding components that are active and/or passive.

What is claimed is:

1. A modular cassette for coiling and holding splices between conductors, the cassette comprising:
   a base module substantially occupying a plane, the module having a conductor entry passage leading to first conductor coiling means and first holding means for holding splices between conductors;
   second conductor coiling means;
   a first additional module receiving conductors, the additional module substantially occupying the same plane as the base module and being secured to the base module by releasable connection means; and
   a second additional module receiving conductors, the second module lying substantially in the same plane as the base module and being secured to the first additional module by releasable connection means;
   wherein the base module contains said second coiling means and wherein the first additional module contains holding means for holding connections between conductors.

2. A modular cassette according to claim 1, wherein the second additional module includes holding means for holding connections between conductors.

3. A modular cassette according to claim 1, wherein the connection-holding means are selected amongst splice-holding means and connector-holding means.

4. A modular cassette according to claim 1, wherein the base module has a conductor exit passage distinct from said entry passage, the exit passage being disposed to guide conductors coming from the first and second coiling means and going to at least one additional module.

5. A modular cassette according to claim 1, wherein the base module includes removable second splice-holding means inserted in a storage position in one of the coiling means.

6. A modular cassette according to claim 1, wherein the releasable connection means are of the snap-fastening tab type.

7. A modular cassette according to claim 1, including at least one protective cover covering one of the splice-holding means.

8. A conductor organizer comprising a plurality of cassettes according to claim 1, the cassette being superposable and pivotally mounted to a housing support.

9. A conductor organizer comprising:
   a plurality of modular cassettes for coiling and holding splices between conductors, each cassettes having:
   a base module substantially occupying a plane, the module having a conductor entry passage leading to first conductor coiling means and first holding means for holding splices between conductors;
   second conductor coiling means;
   a first additional module receiving conductors, the additional module substantially occupying the same plane as the base module and being secured to the base module by releasable connection means;
   wherein the base module contains said second coiling means and wherein the first additional module contains holding means for holding connections between conductors;
   said cassettes being superposable and pivotally mounted to a housing support, wherein each of said superposed cassettes has a flexible cassette pivot arm, the arm being folded and pressed against the base module when the cassette is in its closed position inside the organizer and unfolding while the cassette is being moved into its open position.

* * * * *